(12) United States Patent
Mathis et al.

(10) Patent No.: US 11,926,040 B2
(45) Date of Patent: Mar. 12, 2024

(54) COMPACT LOCKBOLT SWAGE END EFFECTOR WITH COLLAR PICKUP AND RETENTION JAWS

(71) Applicant: The Boeing Company, Chicago, IL (US)

(72) Inventors: Dennis R. Mathis, St. Petersburg, FL (US); Andrew J. Maass, Mt. Pleasant, SC (US); Kyshalee Vazquez, Pittsburgh, PA (US); Daniel B. Freemand, Goose Creek, SC (US); Tyler E. Berkey, Charleston, SC (US)

(73) Assignee: The Boeing Company, Chicago, IL (US)

( * ) Notice: Subject to any disclaimer, the term of this patent is extended or adjusted under 35 U.S.C. 154(b) by 45 days.

(21) Appl. No.: 17/366,589

(22) Filed: Jul. 2, 2021

(65) Prior Publication Data
US 2022/0193920 A1 Jun. 23, 2022

Related U.S. Application Data

(60) Provisional application No. 63/127,700, filed on Dec. 18, 2020.

(51) Int. Cl.
*B25J 15/00* (2006.01)
*B25J 9/10* (2006.01)
*B25J 9/16* (2006.01)
*B25J 13/08* (2006.01)
*F16B 19/10* (2006.01)

(52) U.S. Cl.
CPC ............ *B25J 15/0019* (2013.01); *B25J 9/10* (2013.01); *B25J 13/08* (2013.01); *B25J 15/0028* (2013.01); *B25J 9/1697* (2013.01); *F16B 19/1054* (2013.01); *F16B 19/1063* (2013.01)

(58) Field of Classification Search
CPC ............... B25J 15/0019; B25J 15/0408; B25J 15/0416; B25J 13/08; B25J 9/10; B25J 9/1697; F16B 19/1054; F16B 19/1063
USPC ......................................................... 72/422
See application file for complete search history.

(56) References Cited

U.S. PATENT DOCUMENTS 6,253,448 B1 * 7/2001 Zieve ...................... B21J 15/32
29/709
2017/0056958 A1 * 3/2017 Erickson ............... B23P 19/001

* cited by examiner

*Primary Examiner* — Jimmy T Nguyen
*Assistant Examiner* — Smith Oberto Bapthelus
(74) *Attorney, Agent, or Firm* — Felix L. Fischer

(57) ABSTRACT

A lockbolt swage end effector incorporates a swage tool engaged by a connector assembly to a frame. The frame is attached to a robotic manipulator. A jaw assembly is supported on a mounting assembly, the jaw assembly having opposing articulating jaws forming a recess to engage a collar in a closed position in alignment with a swage puller and die in the swage tool. The articulating jaws release the collar in an open position for operation of the swage tool.

13 Claims, 18 Drawing Sheets

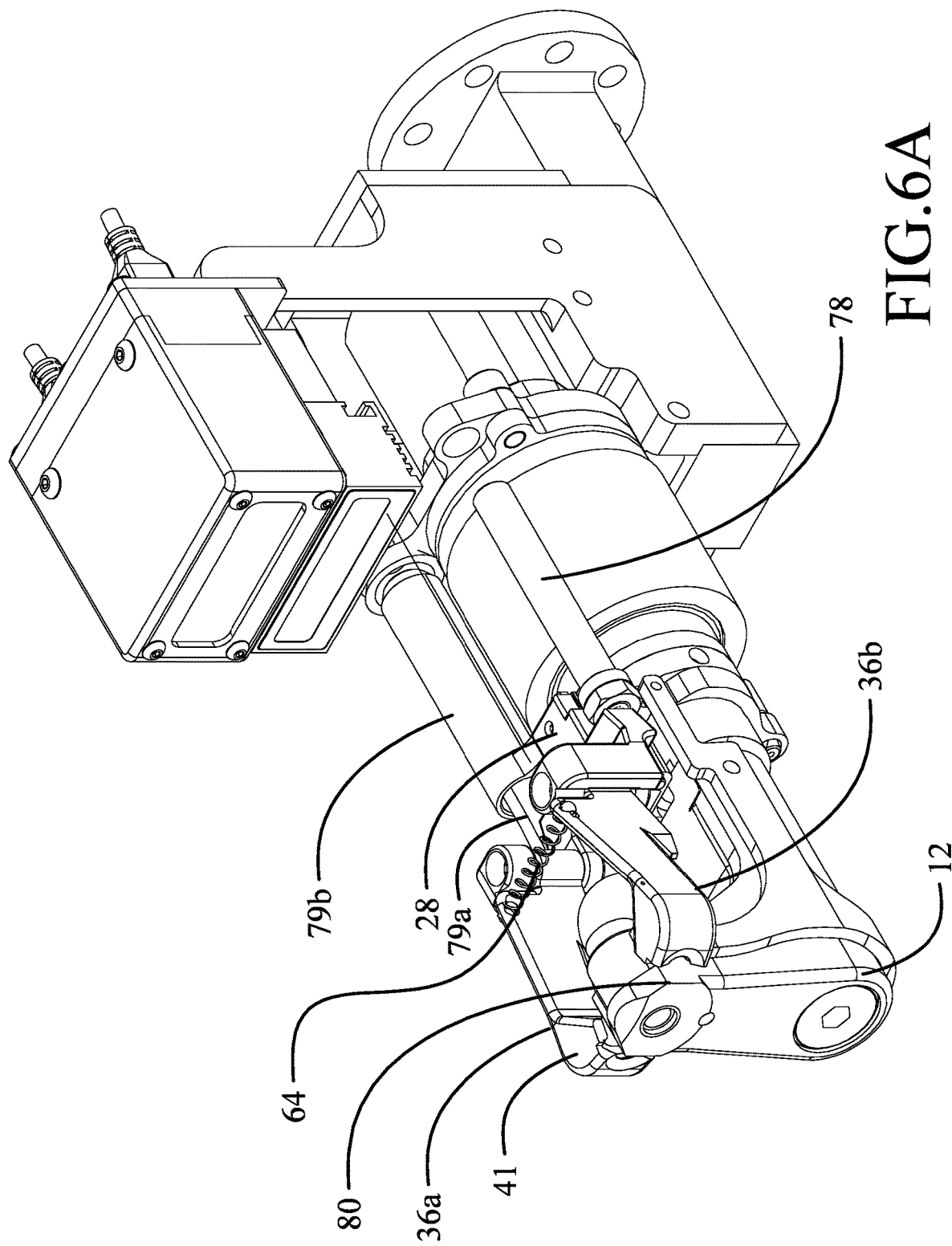

COMPACT LOCKBOLT SWAGE END EFFECTOR WITH COLLAR PICKUP AND RETENTION JAWS

REFERENCE TO RELATED APPLICATIONS

This application claims priority of U.S. provisional application Ser. No. 63/127,700 filed on Dec. 18, 2020 entitled COMPACT LOCKBOLT SWAGE END EFFECTOR WITH COLLAR PICKUP AND RETENTION JAWS having a common assignee with the present application, the disclosure of which is incorporated herein by reference.

This application is copending with application Ser. No. 17/366,624 filed on Jul. 2, 2021 entitled SWAGE END EFFECTOR WITH AUTOMATED FASTENER SIZE CHANGE CAPABILITY having a common assignee with the present application, the disclosure of which is incorporated herein by reference.

BACKGROUND INFORMATION

Field

This disclosure relates generally to the field of structure fabrication systems and, more particularly to a robotic assembler end effector having simultaneously articulating jaws for collar pickup and retention for lockbolt engagement and swaging.

Background

Manufacturing of commercial aircraft and other large scale structures employs robotic systems for many operations. Lockbolt fasteners are extensively used in fabrication of aircraft and other large structures, particularly where large numbers of fasteners are employed in linear arrays to join plate and structural elements. Lockbolt stems protruding from installed locations require mating with a locking collar, swaging of the collar and fracturing of the frangible stem. Assembly and swaging of such lockbolt fasteners is a highly repetitive and time consuming operation. Automated systems for collar selection, positioning and swaging capable of reaching 100% of required installation points in restricted access areas are not currently available.

SUMMARY

Exemplary implementations provide a lockbolt swage end effector incorporating a swage tool engaged by a connector assembly to a frame. The frame is attached to a robotic manipulator. A jaw assembly is supported on a mounting assembly, the jaw assembly having opposing articulating jaws forming a recess to engage a collar in a closed position in alignment with a swage puller and die in the swage tool. The articulating jaws release the collar in an open position for operation of the swage tool.

The exemplary implementations provide a method for automated installation of a lockbolt collar. A carriage is translated simultaneously opening left and right jaws on an end effector having a swage tool. A robotic manipulator is controlled to place the end effector adjacent a stocked collar at a pickup location. The carriage is translated forward simultaneously closing the left and right jaws to engage the collar. The robotic manipulator is positioned adjacent a lockbolt stem and the end effector is advanced for engagement with the stem through the constrained collar and into a swage puller and die of the swage tool. Upon engagement of the collar on the stem, the carriage is translated rearward to open the left and right jaws. The end effector is advanced forward to seat the collar between the swage tool and the structure. The swage tool is activated to swage the collar onto the stem and fracture a sacrificial segment of the stem. The end effector is then pulled off the installed collar.

BRIEF DESCRIPTION OF THE DRAWINGS

The features, functions, and advantages that have been discussed can be achieved independently in various implementations or may be combined in yet other implementations further details of which can be seen with reference to the following description and drawings.

FIGS. 6A and 6B are a pictorial representation and a top view of the example implementation with the jaws in an open position.

DETAILED DESCRIPTION

The implementations described herein provide an end effector to enable automated installation of collars on lockbolts, within confined spaces. The end effector includes a jaw assembly with a pair of articulating jaws configured to pick-up, retain, and install the collars. The jaws simultaneously articulate relative each other. The jaws include a first end and a second end, spaced from the first end. The first end of each jaw defines a recess for accepting and holding a collar and incorporates a beveled face for guiding the collar over a lockbolt. The second end of each jaw is coupled with a hinge to a mounting structure having reciprocating carriage for moving the jaws between an open position and a closed position. A spring is coupled between the jaws distal from the first end for biasing the jaws toward the closed position. Additionally, the jaws include a central portion defining a tapered detent. When in the closed position, the tapered detent engages fixed structure on the end-effector for arresting unwanted movement of the jaws during positioning of the collar on the lockbolt. The tapered detent is free when the jaws are in the open position.

Figure 1:
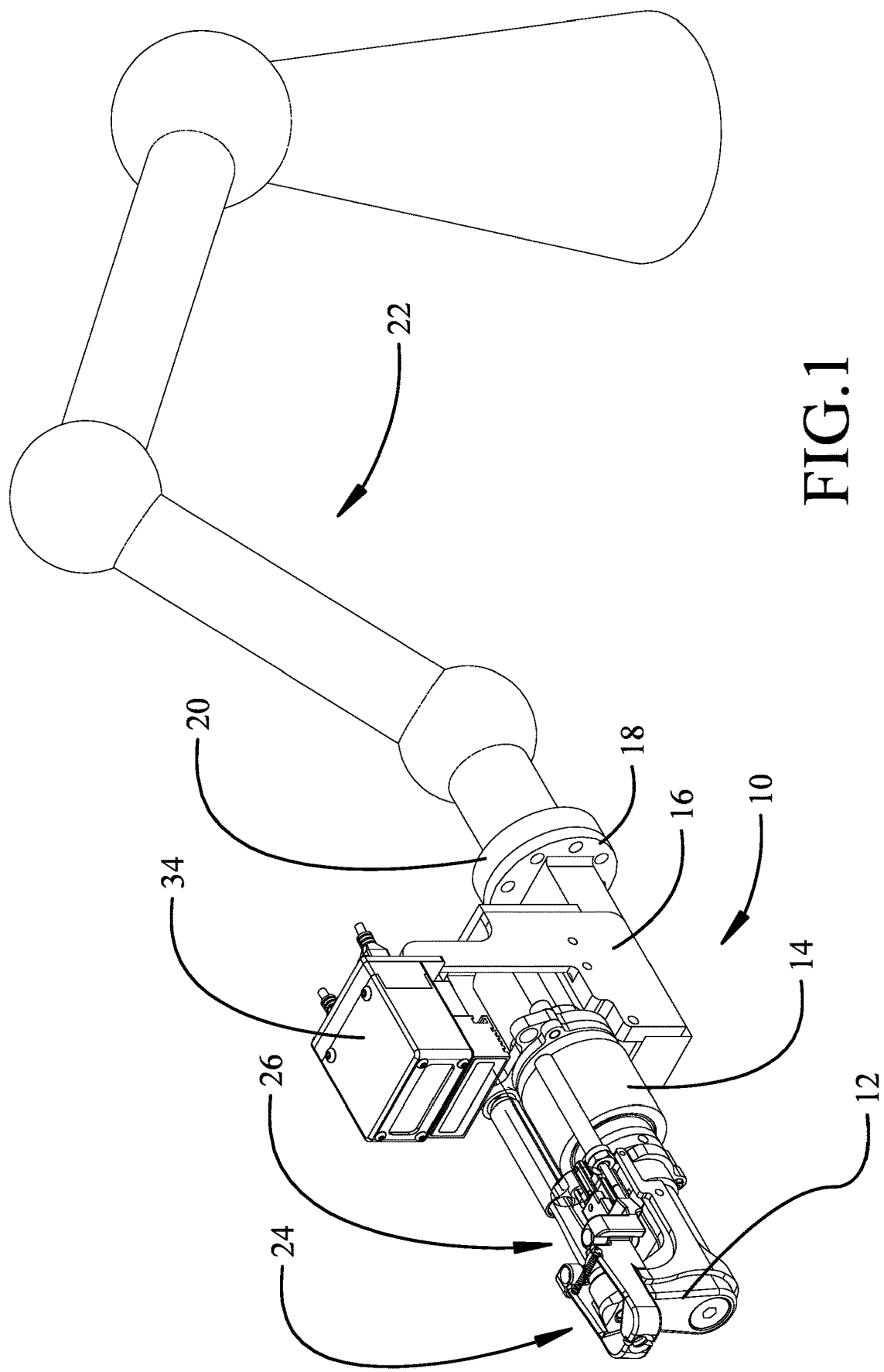
FIG. 1 is a pictorial representation of an example implementation of the robotic assembler end effector.
Figure 2A:
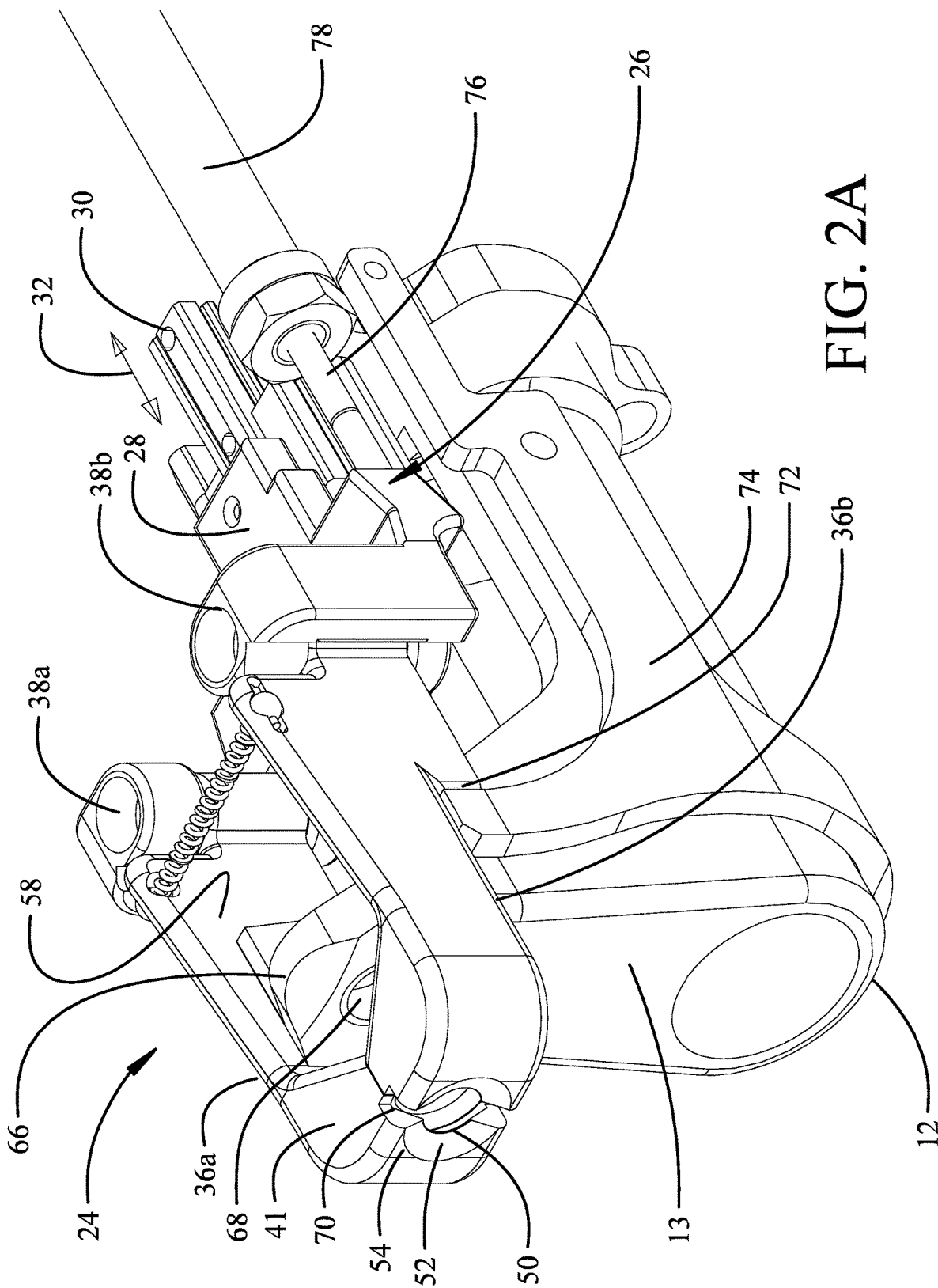
FIGS. 2A and 2B are a detailed pictorial representation and top view of the example implementation with the jaws in a closed position.
Figure 2B:
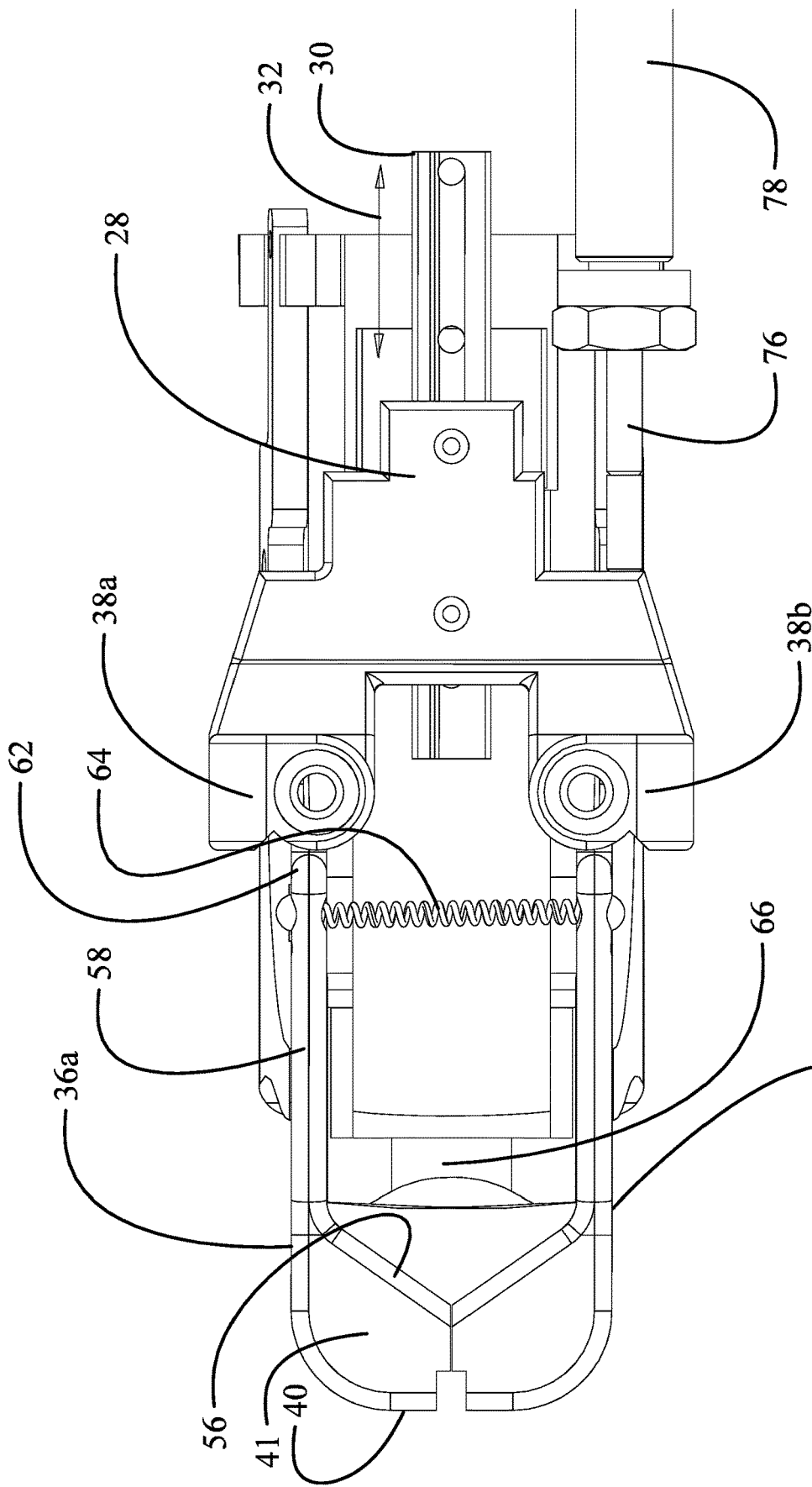

Referring to the drawings, FIGS. 1, 2A and 2B show an example implementation of the lockbolt swage end effector 10. The end effector 10 incorporates a swage tool 12 engaged by a connector assembly 14 to a frame 16 having a connection flange 18. A jaw assembly 24 is supported on a mounting assembly 26 attached to the swage tool 12. The mounting assembly has a carriage 28 mounted on an actuation rail 30 for reciprocal longitudinal motion indicated by arrow 32. A vision system 34 is mounted to the frame 16 in the example implementation. The connection flange 18 is configured to attach the end effector 10 to a mating flange 20 on a robotic manipulator 22. The robotic manipulator 22 provides 6 axis motion and rotation for the mating flange 20 for positioning of the attached end effector. The vision system 34, is employed for use in guidance of the robotic manipulator 22.

Figure 3A:
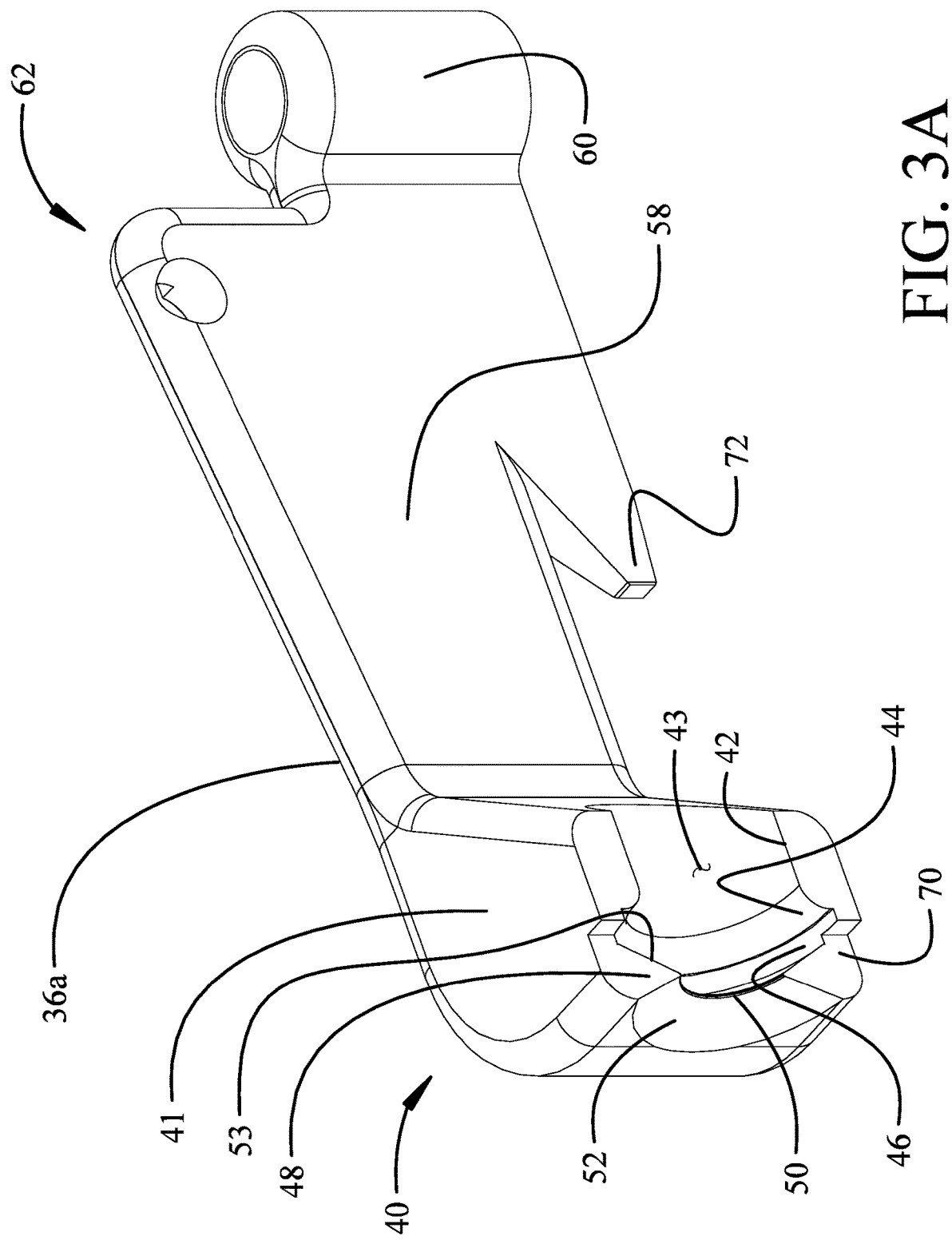
FIGS. 3A and 3B are a detailed pictorial representation and a side view of an articulating jaw in the example implementation.
Figure 3B:
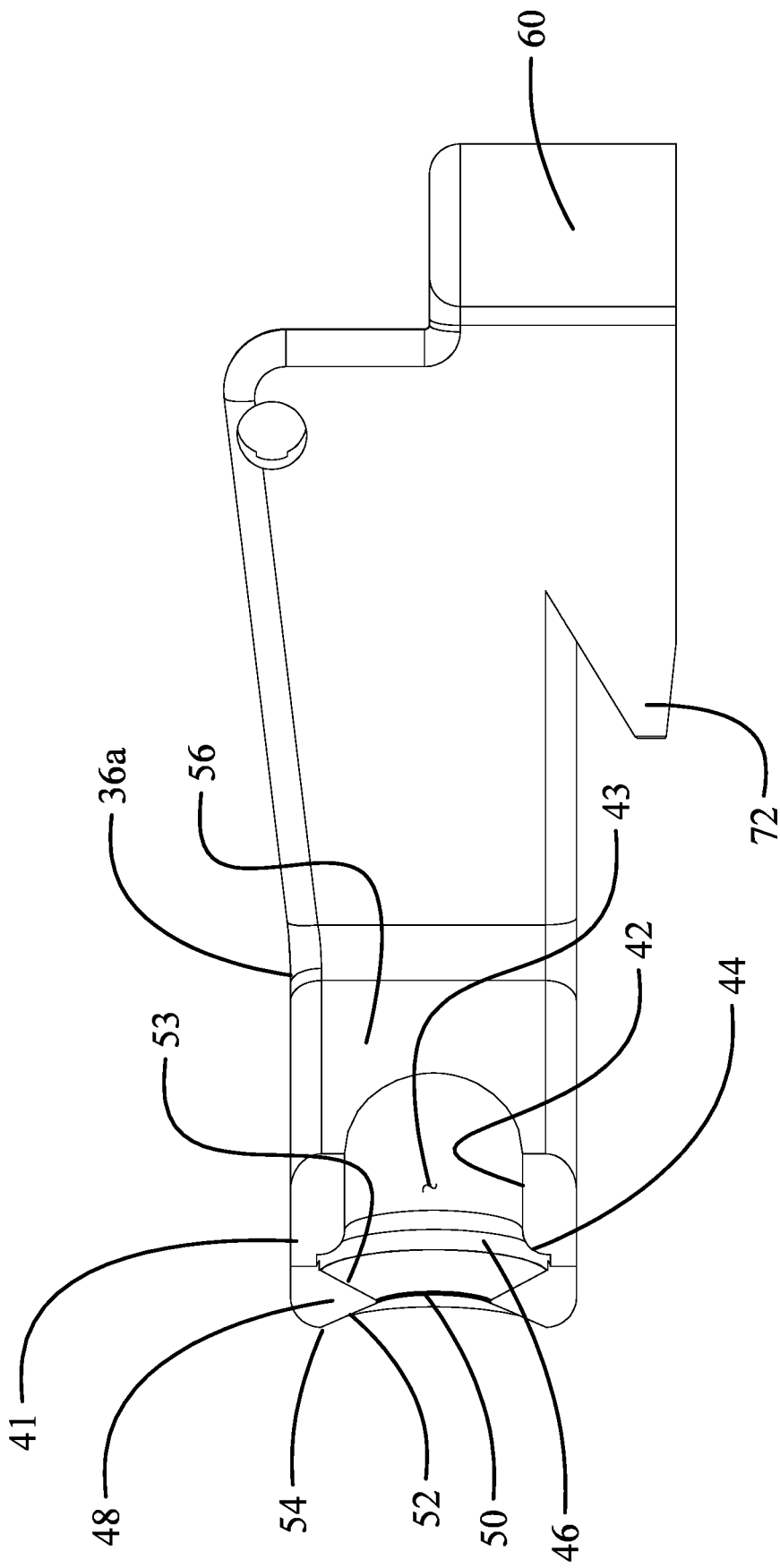
Figure 4A:
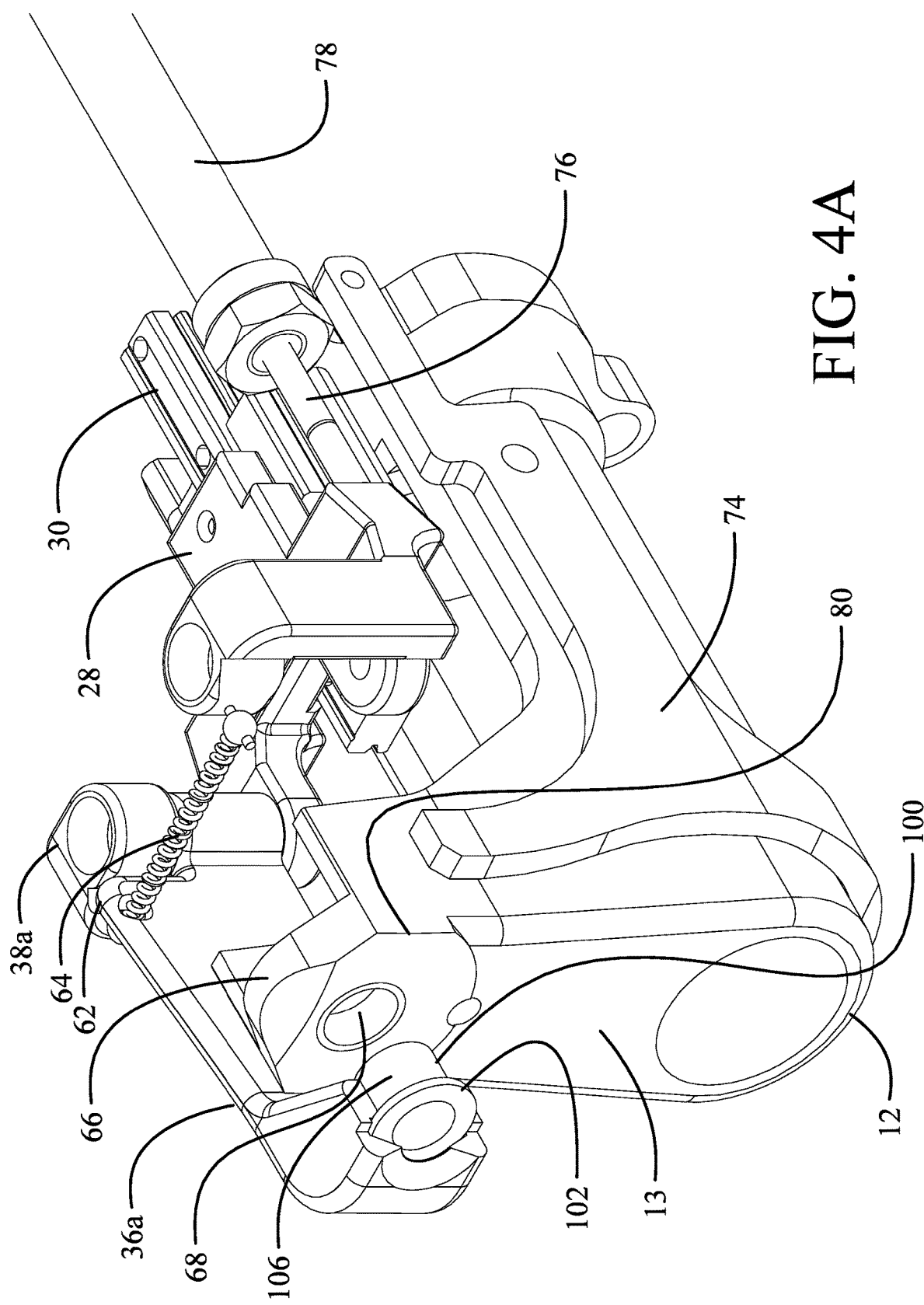
FIGS. 4A, 4B and 4C are a pictorial representation, a top view and a side view of the example implementation with the right jaw removed for clarity.
Figure 4B:
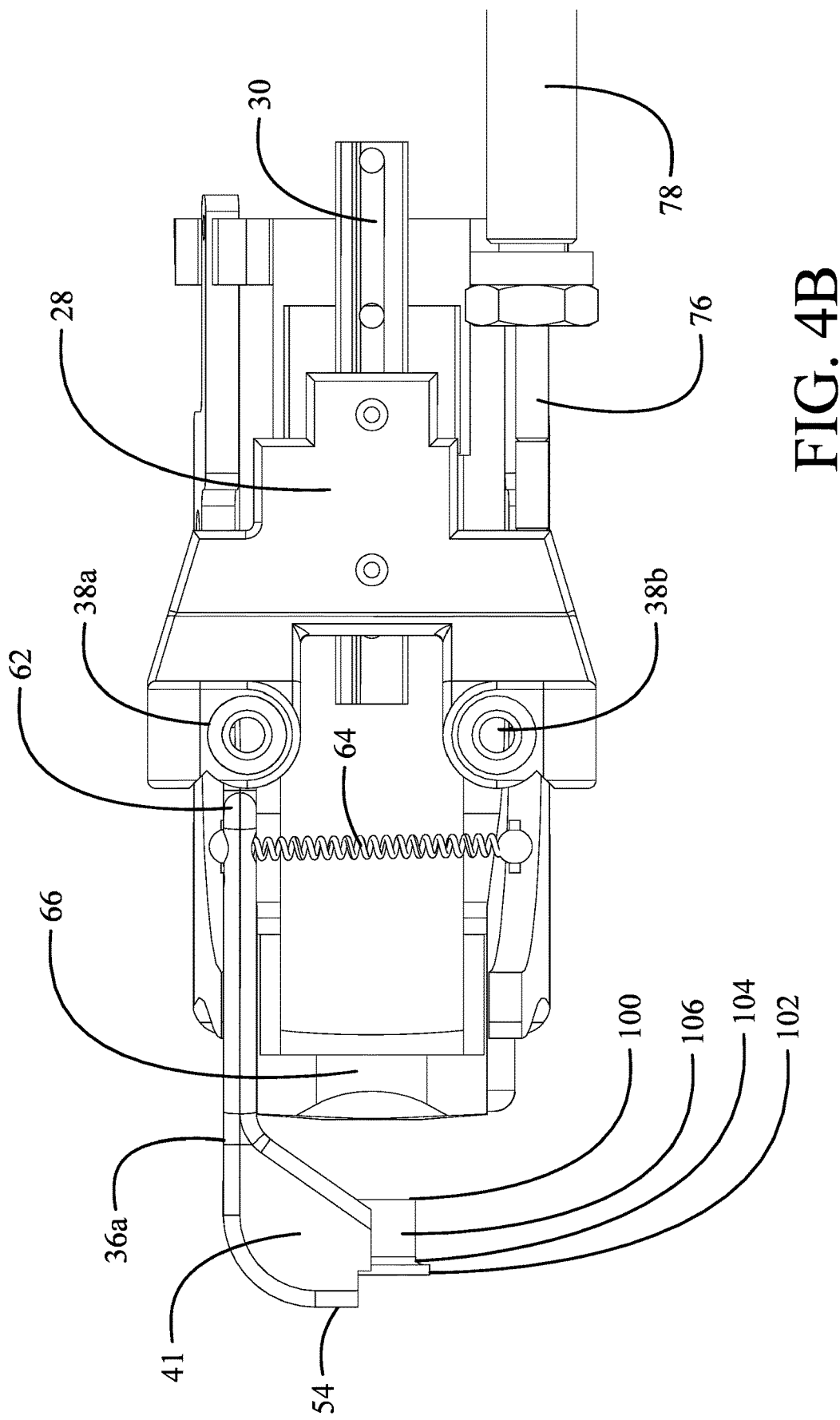
Figure 4C:
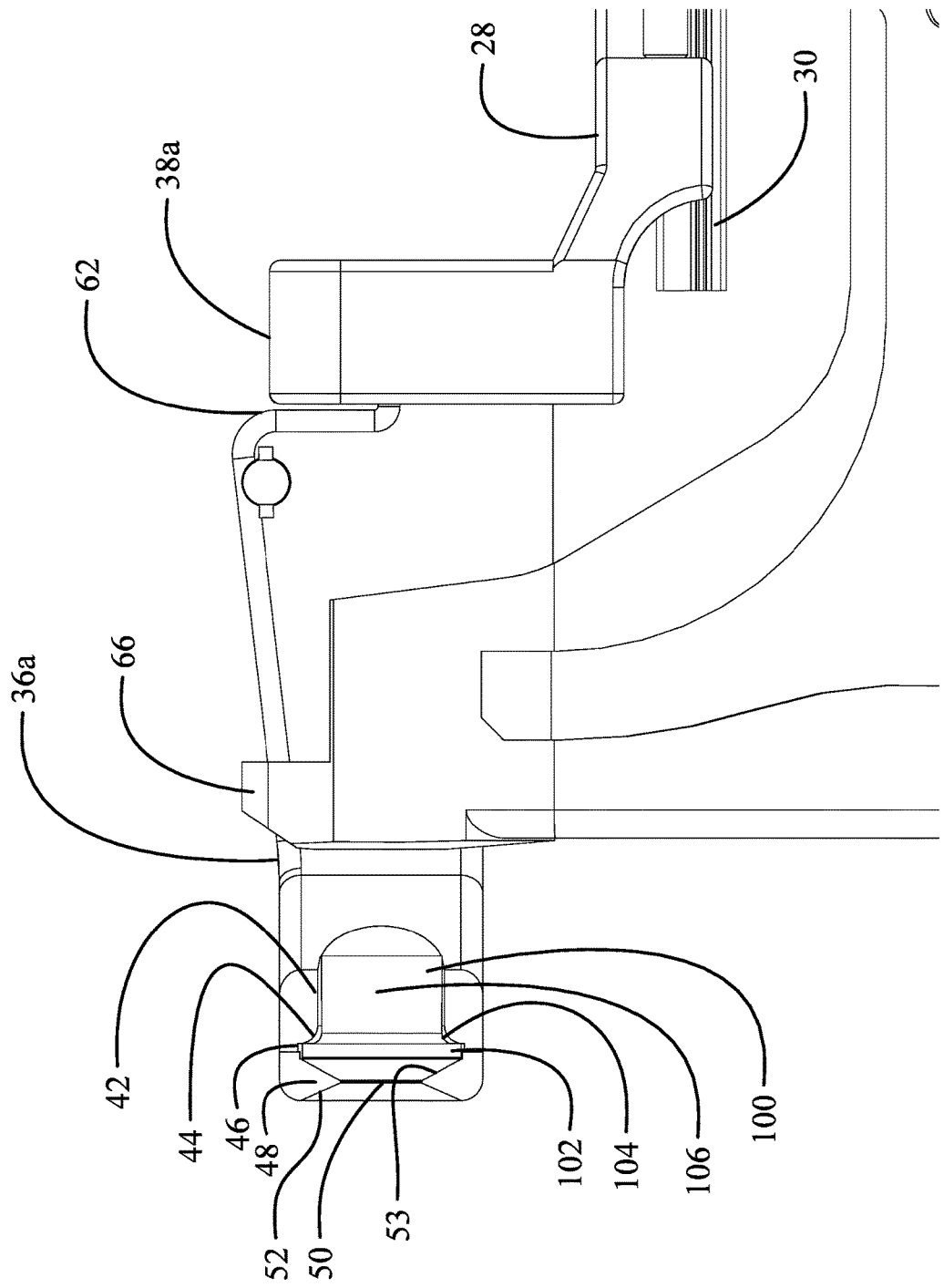

The jaw assembly 24 incorporates opposing left jaw 36a and right jaw 36b each mounted to the carriage 28 on a left hinge column 38a and right hinge column 38b, respectively, for articulating motion from a closed position to an open position. As seen in FIGS. 3A and 3B for the left jaw 36a with the right jaw 36b being symmetrical, a first or front end 40 of each of the left and right jaws 36a, 36b has a capture block 41 with a semi-cylindrical bore 42, the semi-cylindrical bores cooperatively forming a recess 43 sized to receive and constrain a collar 100 (seen in FIGS. 4A-4C with the right jaw 36b removed for clarity) in cooperation with the opposing jaw, as will be described in greater detail subsequently. The bore 42 has a filleted edge 44 expanding into a relief 46 in the capture block 41 to receive a flange 102 of the collar 100 with filleted edge 44 engaging a fillet 104 between the flange 102 and a barrel 106 of the collar. Articulating the opposing left and right jaws 36a, 36b to an open position allows for releasing the collar 100 for operation of the swage tool 12.

A capture blade 48 extends radially inward forward of the relief 46 constricting to an aperture 50 sized to receive a stem 110 of a lockbolt to be engaged by the collar, as will be described subsequently. The capture blade 48 has an outer bevel 52 opening from the aperture 50 to a front face 54 of the capture block 41 and an inner bevel 53 urging the flange 102 of the collar 100 into the relief 46. The capture block 41 has a canted inner face 56 and is connected by an arm 58 to a hinge collar 60 at a second or rear end 62 of each jaw. The hinge collar 60 is engaged in the associated left or right hinge column 38a, 38b on the carriage 28.

A resilient closure mechanism, in the example implementation a spring 64, urges the left and right jaws 36a, 36b into the closed position as seen in FIGS. 2A and 2B as the carriage 28 is translated forward by a rod 76 of an actuating cylinder 78. For the example implementation, the spring 64 is connected between the arms 58 proximate the rear end 62 of the jaws and distal from the front end of the jaws. In the closed position the capture blocks 41 mate and the arms 58 straddle a top engagement boss 66 of the swage tool 12 with a swage puller and die 68 aligned with the closed semi-cylindrical bores 42 in the capture blocks 41. In the exemplary implementation, the capture blades 48 are relieved with a slot 70 extending from the front face 54 into the capture blocks 41.

Figure 5:
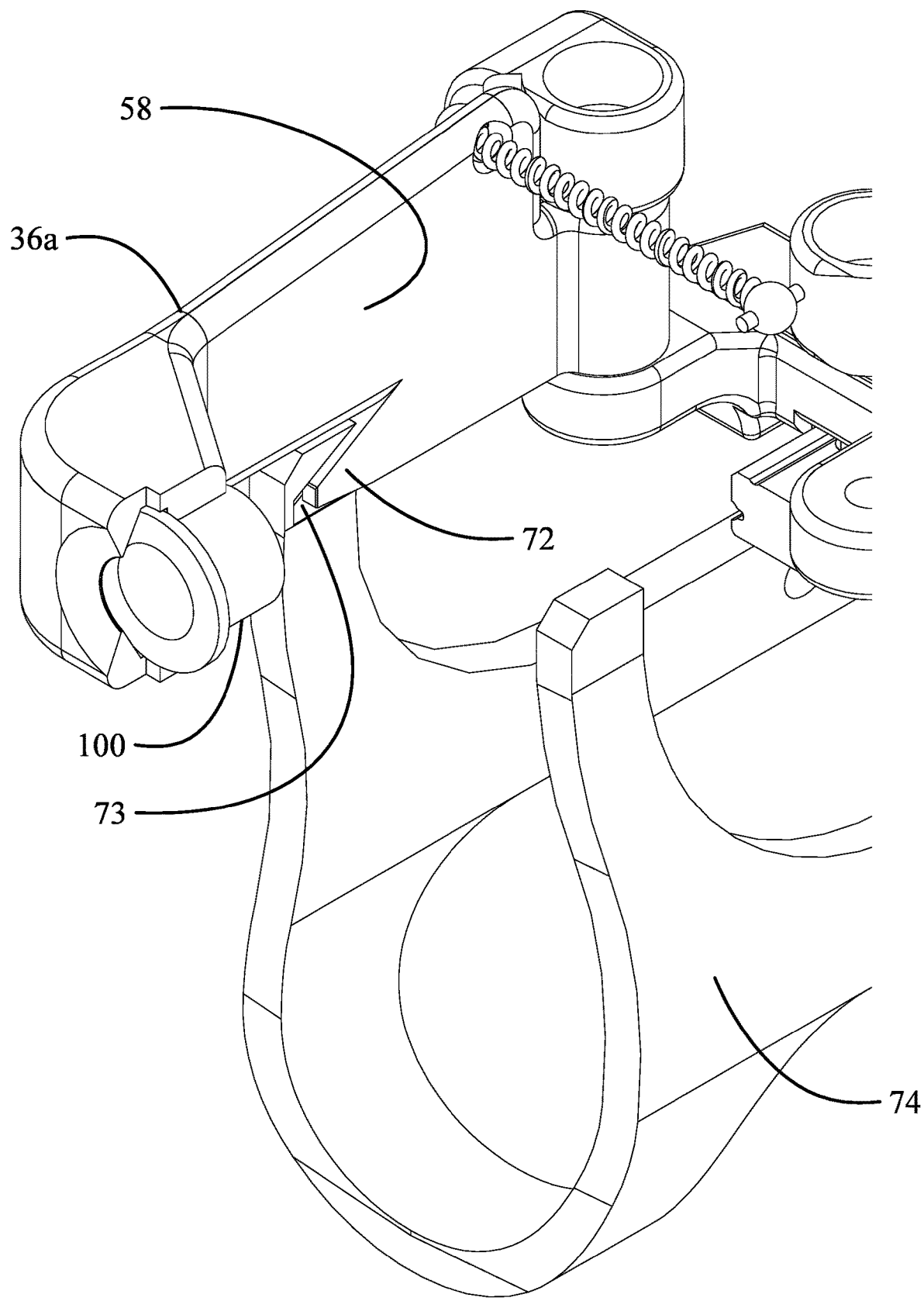
FIG. 5 is a detailed pictorial view of the locking yoke and left jaw showing engagement of the dent and mating relief.

As seen in FIGS. 2A, 3A and 5, the arms 58 of the left and right jaws 36a, 36b each incorporate a tapered detent 72, which, in the closed position of the jaws, is received in a mating relief 73 of a locking yoke 74 rigidly extending from the connector assembly 14. The locking yoke 74 prevents the left and right jaws 36a, 36b from opening due to pressure on the front faces 54 of the jaws after engaging the collar 100 and during positioning and assembly operations with the fastener, as will be described subsequently.

Figure 6B:
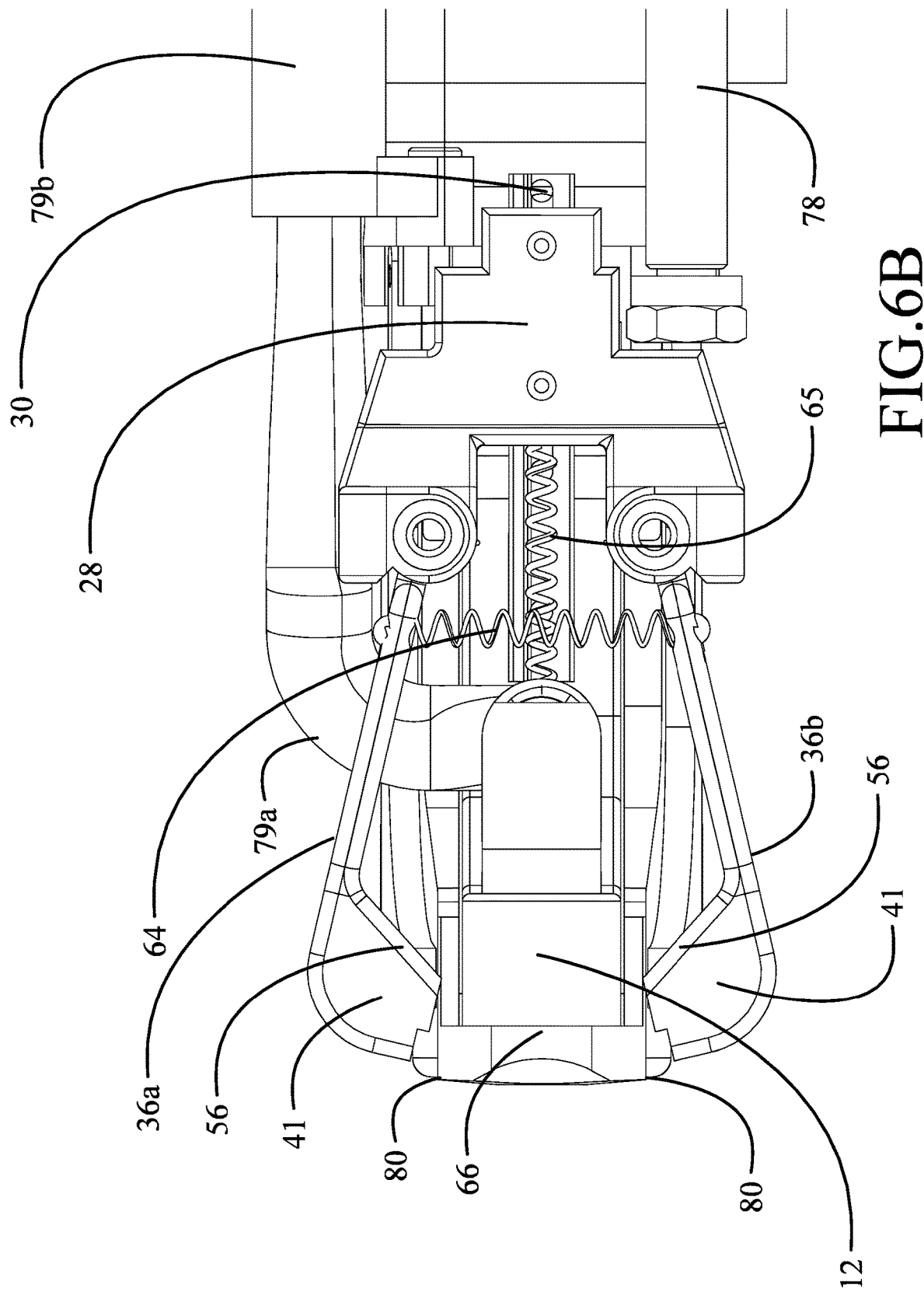

Operation of the left and right jaws 36a, 36b to open and close is accomplished with the carriage 28 which provides both translational and rotational movement of the left and right jaws 36a, 36b. The carriage 28 is operably connected to the rod 76 extending from the actuating cylinder 78 mounted in the connector assembly 14. The actuating cylinder 78 is pneumatic in the exemplary implementation but may be hydraulically or electrically operated. Translation of the carriage 28 rearward on the actuation rail 30 with retraction of the rod 76 in the actuating cylinder 78 places the canted inner faces 56 of the left and right jaws 36a, 36b in sliding engagement with positioning corners 80 (seen in FIGS. 4A and 4B) of the swage tool 12. As the carriage 28 translates rearward, the positioning corners 80, pressing on the canted inner faces 56, urge the arms 58 of the left and right jaws 36a, 36b to rotate open to a fully open position as seen in FIGS. 6A and 6B. Translation of the carriage 28 forward on the actuation rail places the canted inner faces forward of the positioning corners allowing the left and right jaws 36a, 36b to rotate to the closed position thereby mating the capture blocks 41 and positioning the arms 58 to straddle the top engagement boss 66 of the swage tool 12. A resilient element such as a translation spring 65 (seen in FIG. 6B) may provide reaction force for the carriage 28 relative to the actuation rail 30 to supplement operation of the actuating cylinder 78 in one direction allowing the actuating cylinder to be a single action device and urging the carriage and jaws into either a normally open or normally closed position with activation of the actuating cylinder to then close or open the jaws.

Figure 7:
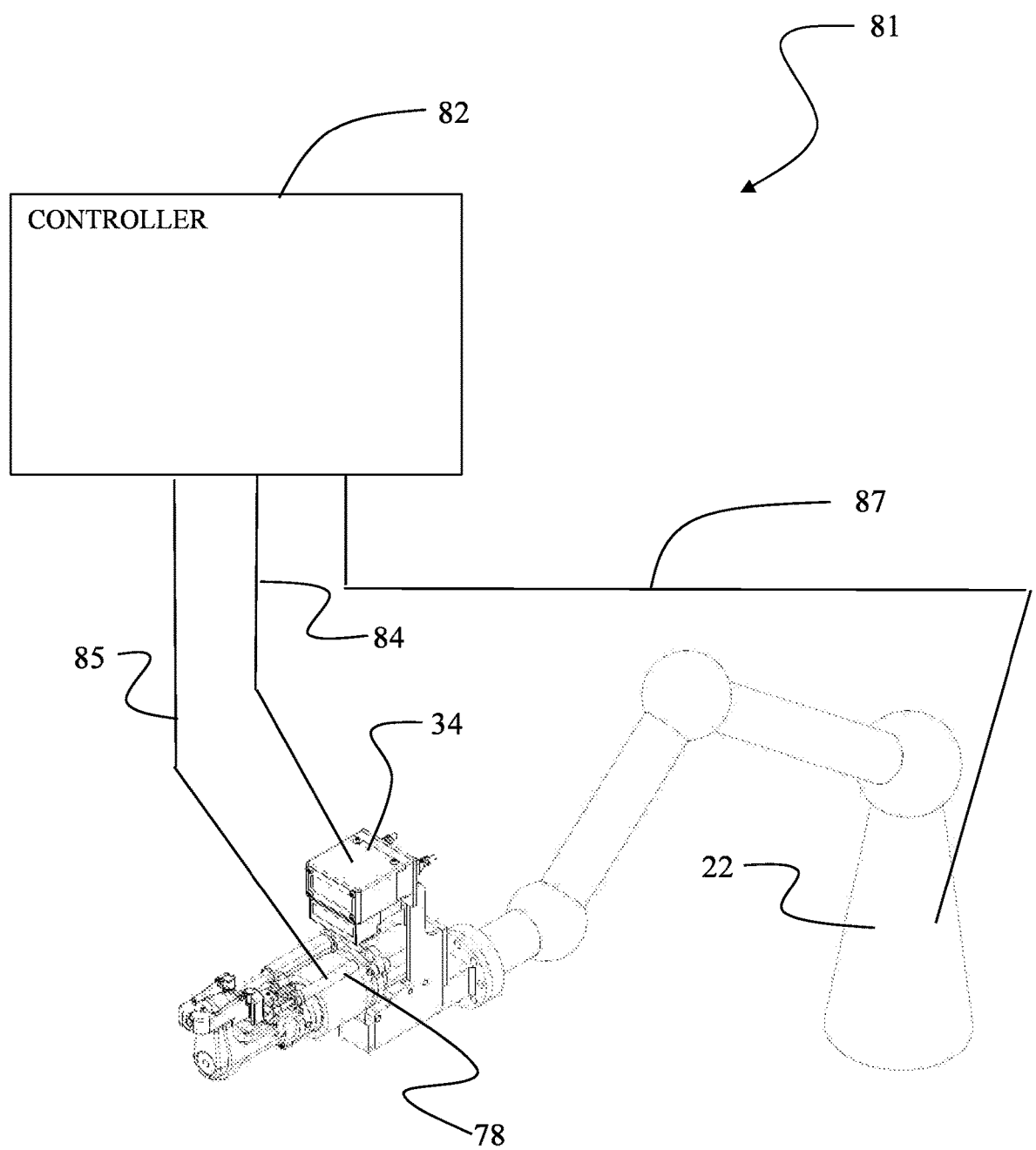
FIG. 7 is a block diagram of a control system for the elements of the implementation.
Figure 8:
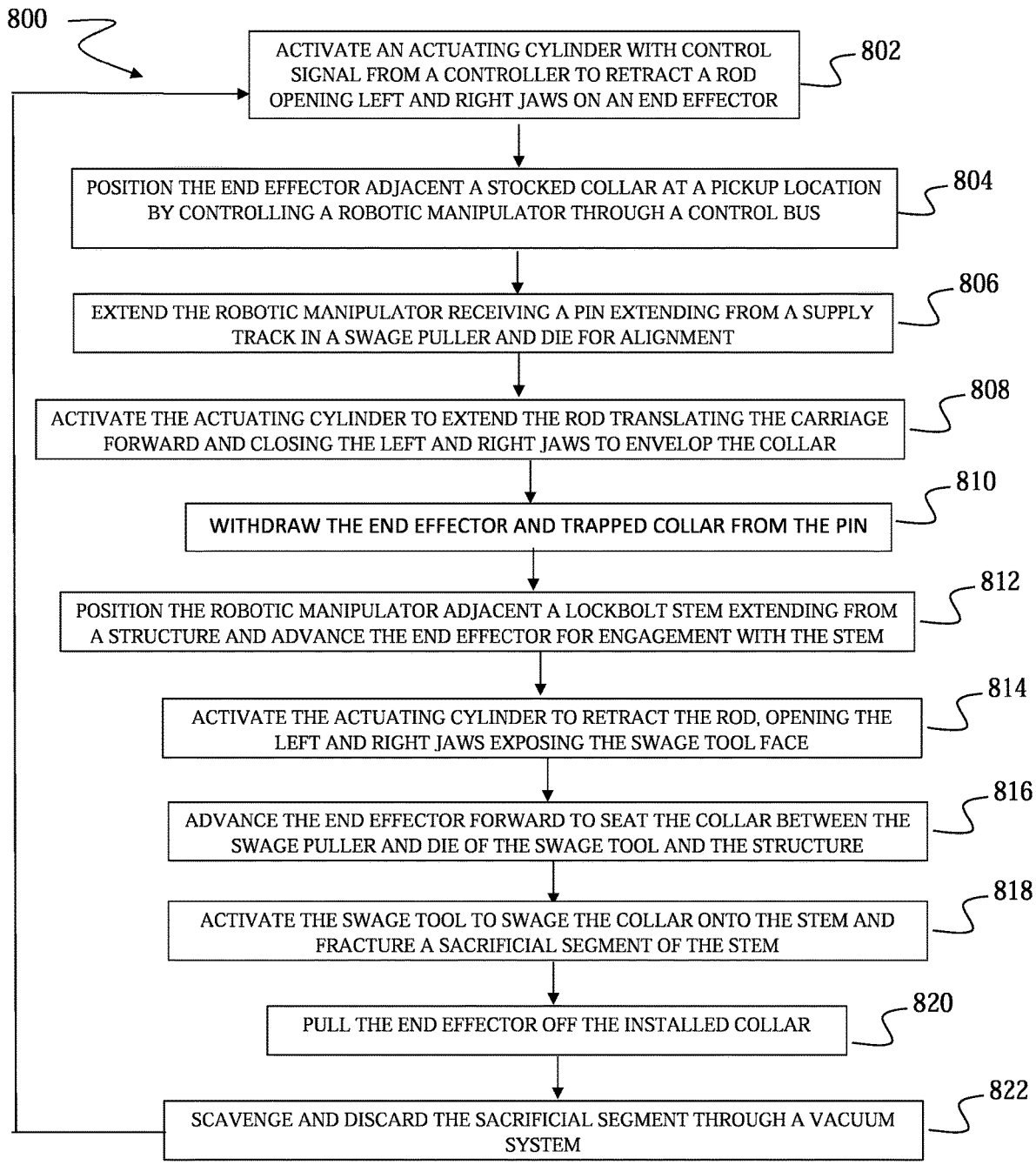
FIG. 8 is a flow chart of a method for hybrid assembly manufacturing using the exemplary implementations; and, FIGS. 9A-9E are pictorial representations of an operational sequence of the implementation.

In operation, as described with respect to FIG. 7 for a block diagram of a control system 81 and FIG. 8 for a method 800 of automated installation of a lockbolt collar, a controller 82 is operably connected to the vision system and the robotic manipulator. The controller 82 activates the actuating cylinder 78 with control signal 85 to retract the rod 76 opening the left and right jaws 36a, 36b, step 802. Alternatively, with a translation spring 65 as previously described, the jaws may be in a normally open configuration.

Figure 9A:
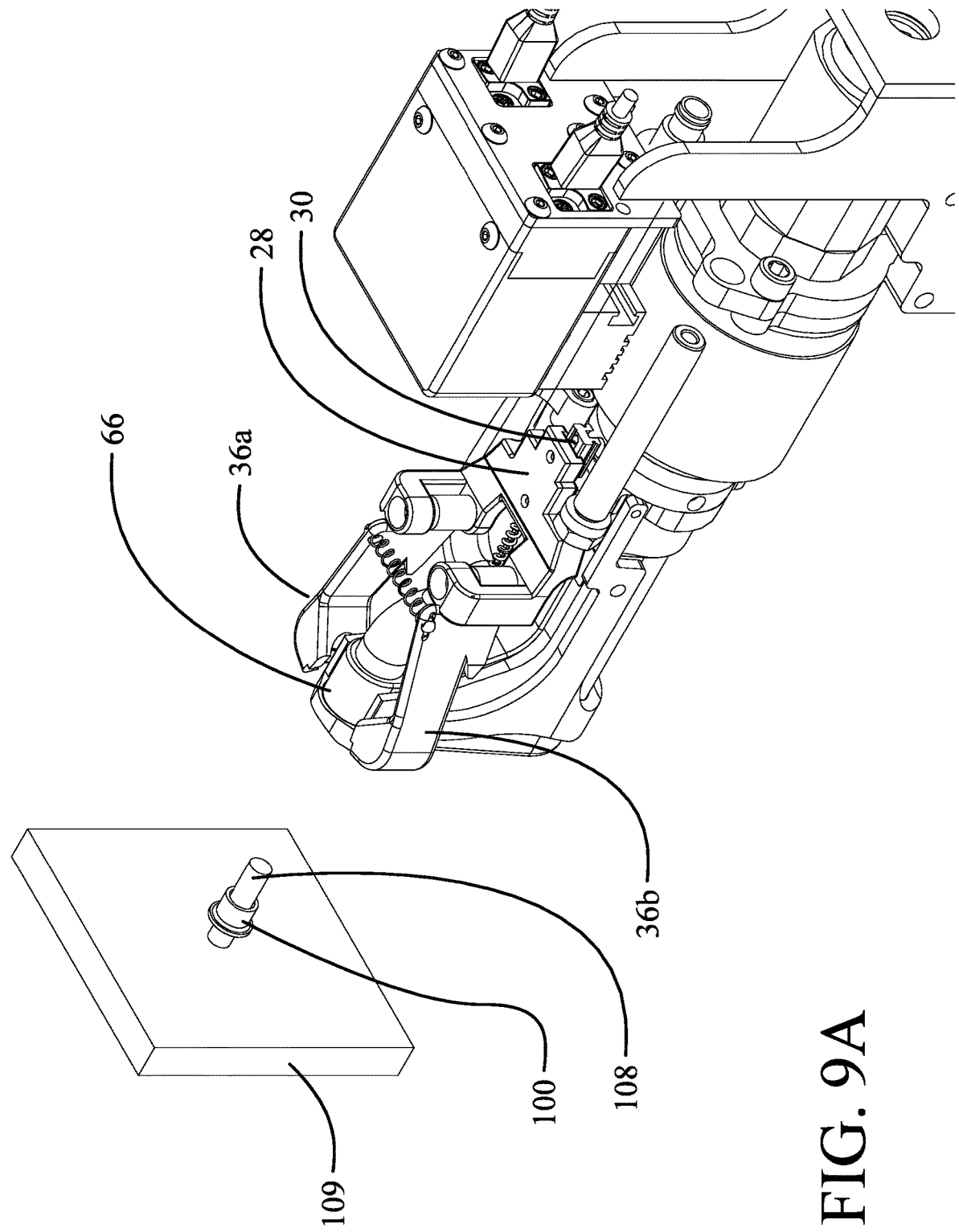
Figure 9B:
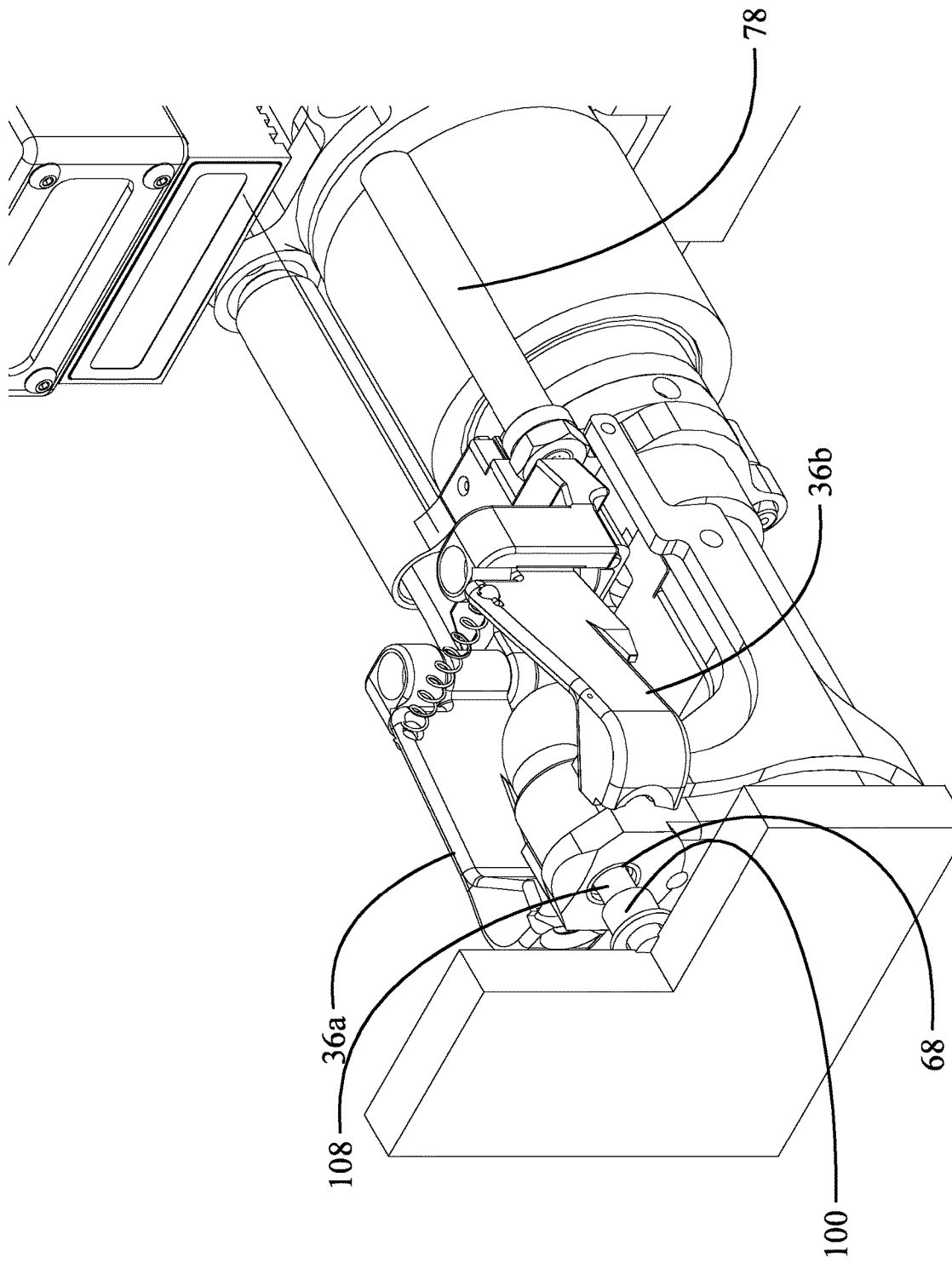
Figure 9C:
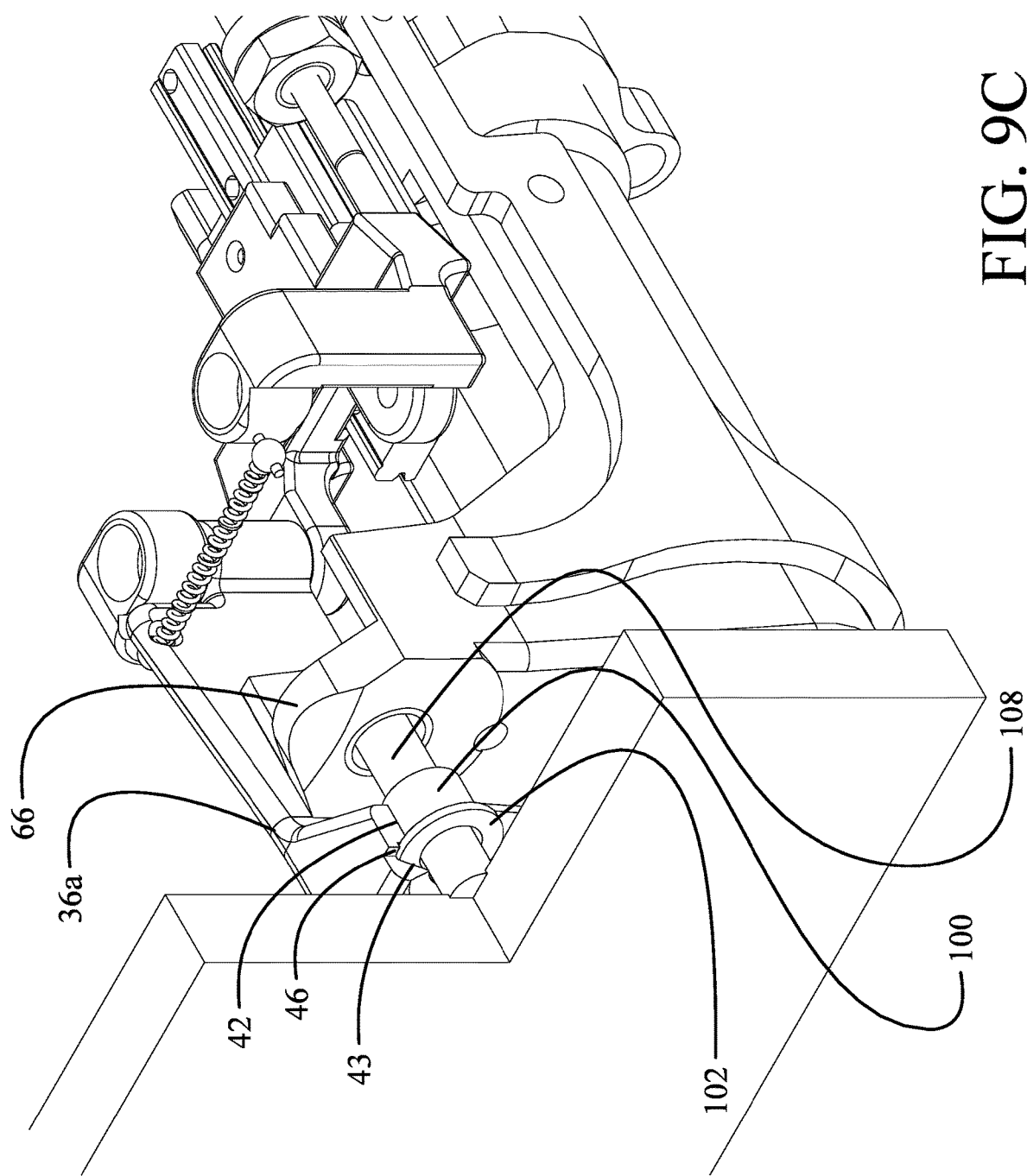

The controller 82 is adapted to position the end effector 10 adjacent a stocked collar 100 at a pickup location by controlling the robotic manipulator 22 through control bus 87, step 804. The collar 100 may be supported by a pin 108 extending from a supply track or board 109 as the pickup location as seen in FIG. 9A. The controller 82 extends the robotic manipulator 22 receiving the pin 108 in the swage puller and die 68 for alignment as seen in FIG. 9B, step 806. The controller 82 then activates the actuating cylinder 78 to extend the rod 76 translating the carriage 28 forward and closing the left and right jaws 36a, 36b to envelop the collar 100 in the semi-cylindrical bores 42 with the inner bevel 53 of capture blade 48 urging the flange 102 of the collar 100 into the relief 46 as seen in FIG. 9C, step 808. Alternatively, for a normally closed position, the translation spring 65 may urge the carriage 28 forward with deactivation of the actuating cylinder. An internal spring in the actuating cylinder 78 or bidirectional vacuum/pressure actuation may alternatively provide this function.

Figure 9D:
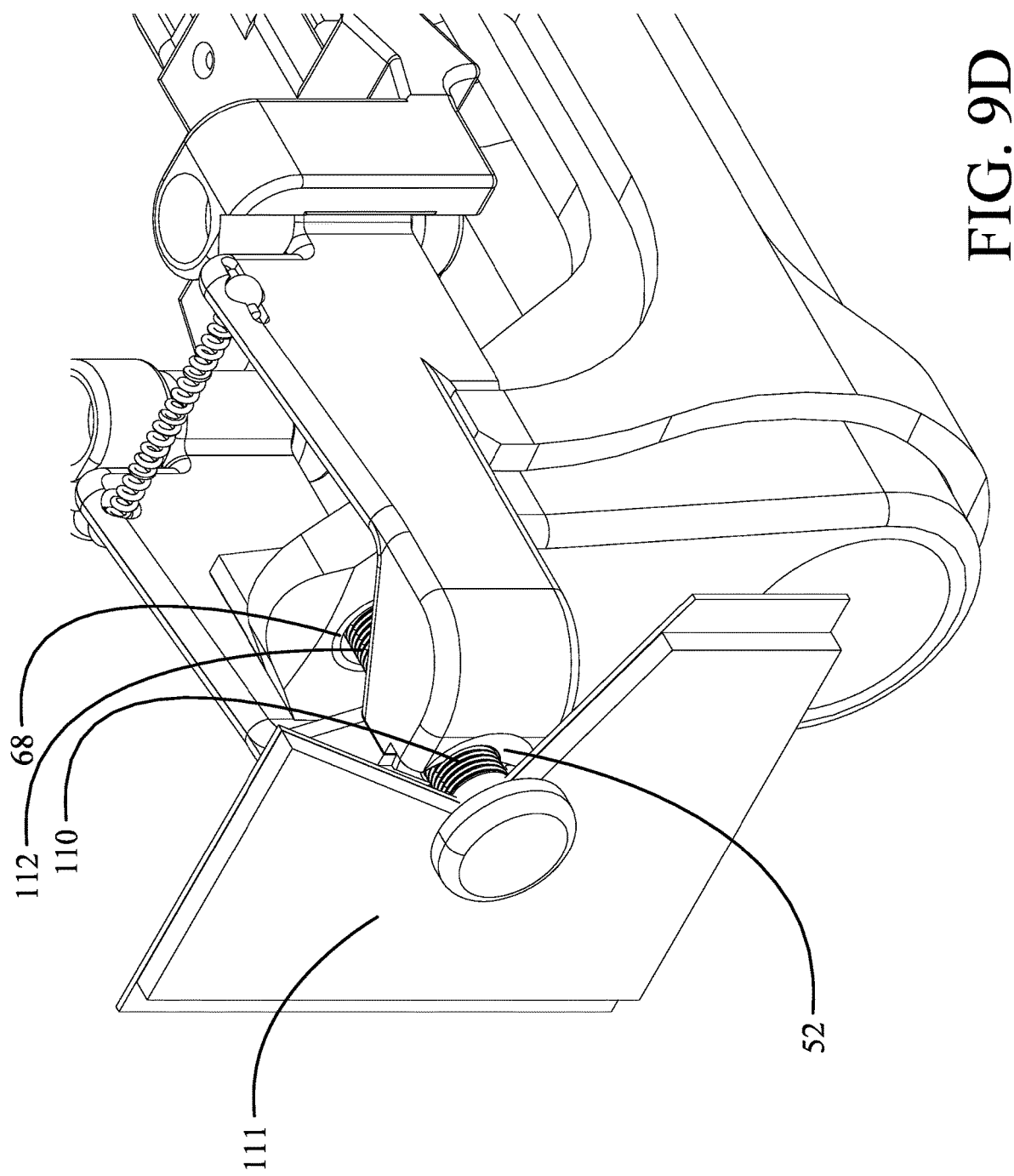

The controller then controls the robotic manipulator 22 to withdraw the end effector 10 and trapped collar 100 from the pin 108, step 810. The controller 82 then receives a position signal 84 from the vision system 34 and positions the robotic manipulator 22 adjacent a lockbolt stem 110 extending from a mated structure 111 and advances the end effector 10 for engagement with the stem 110 as seen in FIG. 9D, step 812, the outer bevel 52 of the capture blade 48 assisting in directing the stem 110 into the aperture 50, through the constrained collar 100 and into the swage puller and die 68 of the swage tool 12. The locking yoke 74 and tapered detent 72 of the arms 58 holding the left and right jaws in the closed position. Upon engagement of the collar 100 on the stem 110, the controller 82 again activates the actuating cylinder

78 to retract the rod 76, opening the left and right jaws 36*a*, 36*b* exposing the swage tool face 13, step 814.

Figure 9E:
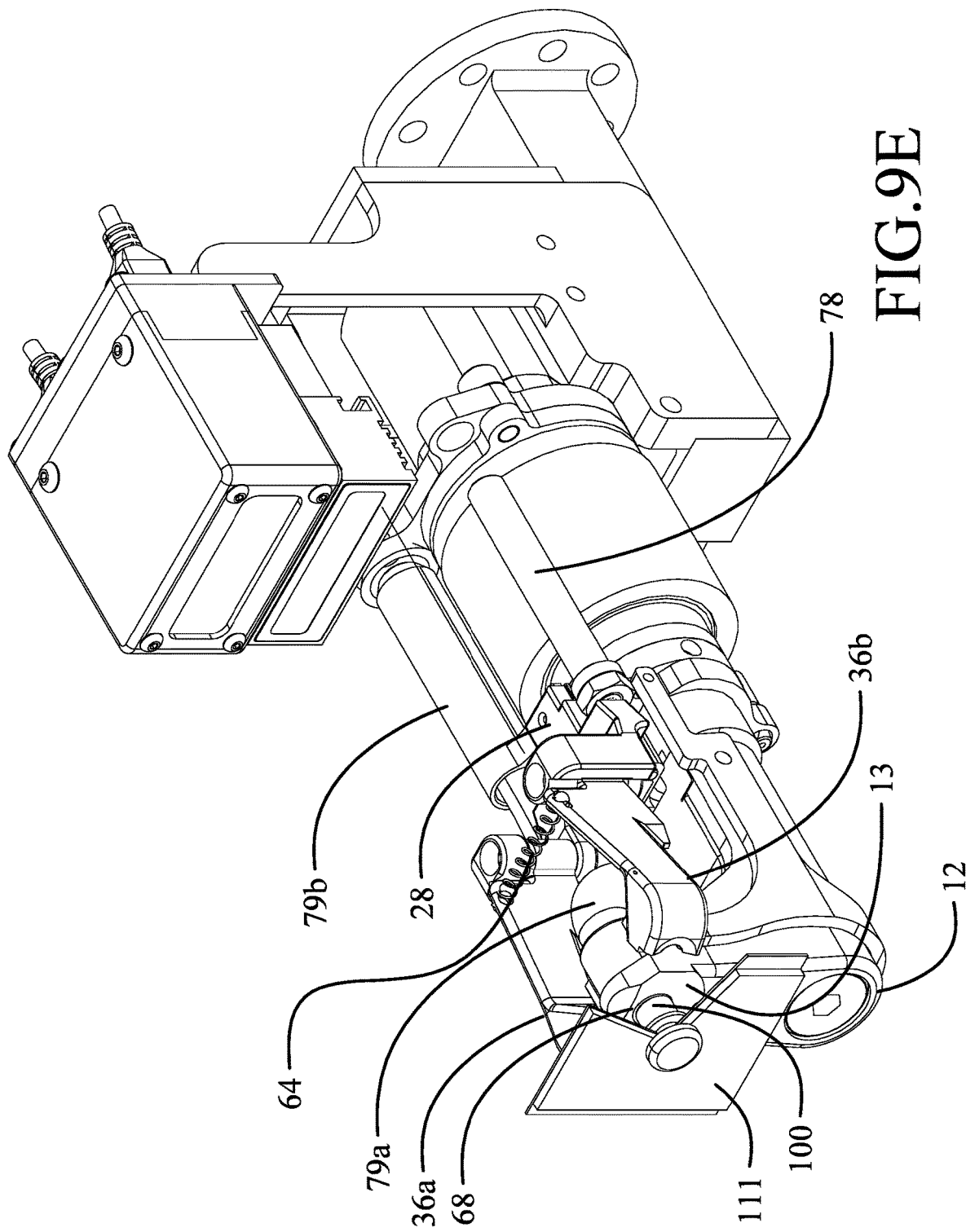

The controller then advances the end effector 10 forward to seat the collar between the swage puller and die 68 of the swage tool 12 and the structure as seen in FIG. 9E, step 816. The swage tool 12 is then activated to swage the collar 100 onto the stem 110 and fracture a sacrificial segment 112 of the stem, step 818. The robotic manipulator 22 then pulls the end effector 10 off the installed collar 100, step 820. For the implementation shown, a debris extractor 79*a* is connected between the connector assembly 14 to the swage tool 12 with a collector 79*b* to scavenge and discard the sacrificial segment 112 through a vacuum system or similar structure, step 822. The robotic manipulator 22 is then repositioned for obtaining the next collar 100 from stock (e.g. the next stocked collar 100).

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. As used herein the terms "upper" and "lower", "left" and "right", "forward" and "rearward" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A lockbolt swage end effector for use with a robotic manipulator to engage a collar, the end effector comprising:
   a swage tool having a swage puller and die, the swage tool engaged by a connector assembly to a frame, wherein the frame is configured to be attached to the robotic manipulator;
   mounting assembly attached to the swage tool, the mounting assembly comprising
   a carriage; and
   an actuation rail on which the carriage is mounted for reciprocal longitudinal motion;
   a jaw assembly supported on the mounting assembly, the jaw assembly having opposing articulating jaws to engage the collar in a closed position in alignment with the swage puller and die in the swage tool, the opposing articulating jaws releasing the collar in an open position for operation of the swage tool, the opposing articulating jaws comprising a left jaw and right jaw, wherein the left jaw is mounted to the carriage on a left hinge column and the right jaw is mounted to the carriage on a right hinge column, the left and right jaws articulating to the closed position upon translation of the carriage forward and to the open position upon translation of the carriage rearward, a front end of each of the left and right jaws has a capture block, wherein the capture block in the left jaw and the capture block in the right jaw cooperatively form a recess sized to receive and constrain the collar, the recess comprising a semi-cylindrical bore in each of the left and right jaws, the semi-cylindrical bore having a filleted edge expanding into a relief in the capture block to receive a flange of the collar, the filleted edge configured to engage a fillet between the flange and a barrel of the collar, a capture blade extending radially inward forward of the relief and constricting to an aperture sized to receive a stem of a lockbolt to be engaged by the collar, the capture blade having an outer bevel opening from the aperture to a front face of each of the left and right jaws to direct the stem into the aperture and an inner bevel urging the flange of the collar into the relief.

2. The lockbolt swage end effector as defined in claim 1, wherein the capture block in each of the left and right jaws has a canted inner face and is connected by an arm to a hinge collar at a rear end of the jaw, the hinge collar engaged in an associated left or right hinge column on the carriage.

3. The lockbolt swage end effector as defined in claim 2 wherein translation of the carriage rearward on the actuation rail places the canted inner faces in sliding engagement with positioning corners of the swage tool to urge the arms of the left and right jaws to the open position.

4. The lockbolt swage end effector as defined in claim 3 wherein translation of the carriage forward on the actuation rail places the canted inner face of each of the left and right jaws forward of the positioning corners allowing the left and right jaws to rotate to the closed position, thereby mating the capture blocks and positioning the arms to straddle a top engagement boss of the swage tool.

5. The lockbolt swage end effector as defined in claim 4 further comprising a spring connected between the arms proximate the rear end of the left and right jaws and distal from the capture blocks, the spring biasing the left and right jaws into the closed position.

6. The lockbolt swage end effector as defined in claim 1 further comprising an actuating cylinder operably connected to the carriage.

7. The lockbolt swage end effector as defined in claim 1 wherein the left and right jaws each incorporate a tapered detent received in a mating relief in a locking yoke in the closed position of the jaws, the locking yoke extending as a fixed structure from the connector assembly.

8. A lockbolt swage end effector for use with a robotic manipulator to engage a collar, the end effector comprising:
   swage tool having a swage puller and die, the swage tool engaged by a connector assembly to a frame, the frame configured to be attached to the robotic manipulator;
   a mounting assembly attached to the swage tool, the mounting assembly comprising:
   a carriage; and
   an actuation rail on which the carriage is mounted for reciprocal longitudinal motion; and
   a jaw assembly supported on the mounting assembly the jaw assembly having opposing articulating jaws forming a recess to engage the collar in a closed position in alignment with the swage puller and die in the swage tool, the opposing articulating jaws releasing the collar in an open position for operation of the swage tool the opposing articulating jaws comprising a left jaw and right jaw, wherein the left jaw is mounted to the carriage on a left hinge column and the right jaw is mounted to the carriage on a right hinge column, the left and right jaws articulating to the closed position upon translation of the carriage forward and to the open position upon translation of the carriage rearward and wherein the left and right jaws each incorporate a tapered decent received in a mating relief in a locking yoke in the closed position of the jaws, the locking yoke extending as a fixed structure from the connector assembly.

9. The lockbolt swage end effector as defined in claim 8 wherein a controller is connected to the end effector and operably engaged to the robotic manipulator, the controller adapted to position the jaw assembly by translating the carriage.

10. The lockbolt swage end effector as defined in claim 9 further comprising a vision system mounted to the frame, the vision system operably connected to the controller.

11. The lockbolt swage end effector as defined in claim 8 wherein a front end of each of the left and right jaws has a capture block, wherein the capture block in the left jaw and the capture block in the right jaw cooperatively form a recess sized to receive and constrain the collar, the recess comprising a semi-cylindrical bore in each of the left and right jaws, the semi-cylindrical bore having a filleted edge expanding into a relief in the capture block to receive a flange of the collar, the filleted edge configured to engage a fillet between the flange and a barrel of the collar.

12. The lockbolt swage end effector as defined in claim 11 wherein a capture blade extends radially inward forward of the relief, constricting to an aperture sized to receive a stem of a lockbolt to be engaged by the collar, the capture blade having an outer bevel opening from the aperture to a front face of each of the left and right jaws to direct the stem into the aperture and an inner bevel urging the flange of the collar into the relief.

13. The lockbolt swage end effector as defined in claim 12 wherein the capture block in each of the left and right jaws has a canted inner face and is connected by an arm to a hinge collar at a rear end of the jaw, the hinge collar engaged in an associated left or right hinge column on the carriage.

* * * * *

UNITED STATES PATENT AND TRADEMARK OFFICE
CERTIFICATE OF CORRECTION

PATENT NO. : 11,926,040 B2
APPLICATION NO. : 17/366589
DATED : March 12, 2024
INVENTOR(S) : Dennis R. Mathis et al.

It is certified that error appears in the above-identified patent and that said Letters Patent is hereby corrected as shown below:

In the Claims

Column 6, Line 40 In Claim 8, "swage tool" is corrected to read "a swage tool".
Column 6, Line 62 In Claim 8, "decent" is corrected to read "detent".

Signed and Sealed this
Sixteenth Day of April, 2024

Katherine Kelly Vidal
*Director of the United States Patent and Trademark Office*